(12) United States Patent  (10) Patent No.: US 7,909,473 B2
Deppe  (45) Date of Patent: Mar. 22, 2011

(54) METHOD FOR OPERATING A HIGH-INTENSITY DISCHARGE LAMP, LAMP DRIVER AND PROJECTION SYSTEM

(75) Inventor: Carsten Deppe, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 433 days.

(21) Appl. No.: 12/066,500

(22) PCT Filed: Sep. 1, 2006

(86) PCT No.: PCT/IB2006/053056
§ 371 (c)(1),
(2), (4) Date: Mar. 12, 2008

(87) PCT Pub. No.: WO2007/031900
PCT Pub. Date: Mar. 22, 2007

(65) Prior Publication Data
US 2008/0246926 A1   Oct. 9, 2008

(30) Foreign Application Priority Data

Sep. 12, 2005   (EP) .................................... 05108327

(51) Int. Cl.
*H05B 37/00*   (2006.01)
(52) U.S. Cl. ............... 353/85; 315/96; 315/97; 315/291
(58) Field of Classification Search .................... 353/85; 315/96, 97, 291
See application file for complete search history.

(56) References Cited

U.S. PATENT DOCUMENTS

| 4,207,497 A * | 6/1980 | Capewell et al. ............... 315/96 |
| 4,207,498 A * | 6/1980 | Spira et al. ....................... 315/97 |
| 5,150,014 A | 9/1992 | Kastelein |
| 5,684,367 A | 11/1997 | Moskowitz et al. |
| 6,184,633 B1 | 2/2001 | Kramer |
| 6,670,779 B2 * | 12/2003 | Shen ............................. 315/291 |
| 2003/0102824 A1 | 6/2003 | Kramer |
| 2004/0095076 A1 | 5/2004 | Kastle et al. |

FOREIGN PATENT DOCUMENTS

| WO | WO02091806 A1 | 11/2002 |
| WO | W002097548 | 12/2002 |

* cited by examiner

*Primary Examiner* — Seung C Sohn

(57) ABSTRACT

There is described a method for operating a high-intensity discharge lamp (2), in which the high-intensity discharge lamp (2) is acted upon by an AC current (I) which commutates between positive pulses (Ip) and negative pulses (In) with a predefined current amplitude (IA), wherein a pulse width ratio between the pulse width of a positive pulse (Ip) and the pulse width of an adjacent negative pulse (In) is modulated in such a way that the mean current value (I) of two successive positive and negative pulses (Ip, In) fluctuates periodically between positive and negative values. In addition, the value of the current amplitude (IA) is modulated in accordance with a predefined modulation function (M). A description is also given of a corresponding lamp driver (10) for a high-intensity discharge lamp (2) and of a projection system (1) comprising such a lamp driver (10).

20 Claims, 4 Drawing Sheets

METHOD FOR OPERATING A HIGH-INTENSITY DISCHARGE LAMP, LAMP DRIVER AND PROJECTION SYSTEM

The invention relates to a method and to a lamp driver for operating a high-intensity discharge lamp, in particular within a projection system. The invention furthermore relates to a projection system comprising a high-intensity discharge lamp and such a lamp driver.

High-intensity discharge lamps usually consist of a tube made of a high-temperature-resistant material, for example quartz glass, into which electrodes usually protrude from opposite sides, said electrodes usually being made of tungsten. The tube contains a filling of one or more noble gases and in the case of a mercury vapor lamp primarily of mercury. An arc is produced between the electrode tips by applying a high voltage between the electrodes, and said arc can then be maintained at a lower voltage. On account of their optical properties, high-intensity discharge lamps are preferably used inter alia for projection systems. For such applications, light sources are required which are as far as possible punctiform light sources. Furthermore, a high light intensity is required while at the same time having a spectral composition of the light that is as natural as possible. These requirements can at present best be achieved with high-intensity discharge lamps, also referred to as HID lamps, and in particular UHP lamps (Ultra High Performance lamps).

Particularly when such lamps are used in projection systems which make use of a time-sequential method for color production, it must be ensured that undesirable fluctuations in light intensity do not occur, since these can lead to one primary color undesirably dominating over the other primary colors in the projection system, or to different brightnesses existing in different image regions.

There are currently two types of time-sequential color production method:

In a first method, the color image is produced by a sequential representation of complete images in the three primary colors. This method is also referred to as "Field Sequential Color". This method is used for example in most DLP® projectors (DLP=Digital Light Processing, DLP is a trademark of Texas Instruments®). A fourth, white image can optionally also be mixed in.

In a second method, the color image is essentially produced by all the primary colors running across the display one after the other in the form of color beams or color strips. This method is also referred to as "Scrolling Color". By way of example, conventional LCoS displays (LCoS=Liquid Crystal on Silicon) operate by means of such methods.

In both cases, the projection system requires a so-called color change system which firstly performs color separation or color filtering and secondly has a modulator for varying the color components between the light source and the display, so that the light can be produced in the three primary colors. The color separation and color modulation can usually more or less be integrated in one component. For example, in some color change systems, the filtering and color modulation are carried out by a rotating color wheel. By contrast, in other systems, the color filtering takes place by means of mirrors and the color modulation takes place by means of prisms.

In order to load the electrodes of the high-intensity discharge lamps as uniformly as possible and thus increase the service life of the lamps, most lamps are operated with an AC current—usually a square-wave AC current. In this case, to prevent undesirable instabilities of the arc, such as so-called "arc jumping" or "fluttering" for example, particular forms of supply current are necessary. The currently used method is the pulsed mode, which exhibits a very good service life with perfect stability. In this mode, the lamp is operated with a square-wave AC current, with an additional current pulse—the so-called "anti-flutter pulse" being superposed at the end of each half-period, which ensures that the position of the arc within the lamp remains as stable as possible. However, this leads to various problems in the abovementioned display systems which operate with time-sequential color display. In particular, in some of the systems, the anti-flutter pulse cannot be used at all or can be used only if large drawbacks are accepted. One particular drawback is that, for good lamp operation, the length and amplitude of the pulses can be selected only within narrow limits.

WO 02/091806 A1 discloses an alternative actuation of the lamp with a constant light current. In this case, the high-intensity discharge lamp is acted upon by a relatively high-frequency AC current with a frequency of between 250 to 20,000 Hz, with the value of the current amplitude being constant in each case. The pulse width ratio between the pulse width of a positive pulse and the pulse width of a subsequent or preceding negative pulse is modulated in such a way that the mean current value of two successive positive and negative pulses with a predefined pulse width modulation frequency of for example up to 250 Hz fluctuates periodically between a positive and a negative value. That is to say that the position of the commutation times within one full AC current period is modulated with the predefined pulse width modulation frequency, said full AC current period being defined by the length of two successive pulses, one positive and one negative pulse. The modulation here is usually sinusoidal. In this method, therefore, anode and cathode are swapped in a relatively rapid rhythm, in order thus to achieve equal loading of the two electrodes. However, the relatively slow modulation of the mean current value between the positive and negative value ensures that the temperature loading of the two electrodes is varied slowly and periodically. With such a pulse width modulation mode (PWM mode), a very good service life is likewise achieved with only a minimal fluttering tendency of the lamp at a constant light current.

In modern projection systems, particularly those systems which make use of time-sequential color production, it would be highly desirable if specific quantities of light can be produced in a precisely defined manner within certain time periods. However, these times must be oriented precisely according to the requirements of the display used in the projection system. It is then possible, for example, to improve the overall brightness, to increase the gray level resolution and to better balance out the color dot of the image. To this end, it would be necessary from time to time to reduce the light power in precisely defined time periods, for example in precisely specified color strips, and to increase it in other time periods.

It is an object of the present invention to provide a method for operating a high-intensity discharge lamp, in particular within a projection system, and also a suitable lamp driver and a corresponding projection system, which permits in a simple and cost-effective manner more precise control of the light intensity according to the predefined requirements.

This object is achieved by a method as claimed in claim 1 and a lamp driver as claimed in claim 8 and a projection system as claimed in claim 10.

In the method according to the invention, the high-intensity discharge lamp is acted upon by an AC current which commutates with a predefined commutation frequency between positive pulses and negative pulses with a predefined current amplitude, wherein the pulse width ratio between the pulse width of a positive pulse and the pulse width of an adjacent negative pulse is modulated in such a way that the mean current value of two successive positive and negative pulses—one positive pulse and one negative pulse—fluctuates periodically between positive and negative values with a predefined pulse with modulation frequency, that is to say that the position of the commutation time within one full AC current period, consisting of one positive and one negative pulse, is shifted periodically with a predefined pulse width modulation frequency. According to the invention, the value of the current amplitude is modulated as a function of time in accordance with a predefined modulation function.

The invention consequently makes use of the operating method described in WO 02/091806 A1 and superposes on this method a further modulation, namely an amplitude modulation, wherein this amplitude modulation can be carried out according to the requirements of the projection system, in particular of the display device. For more specific details regarding the method and the effect of the pulse width modulation, reference should therefore be made to WO 02/091806 A1, the contents of which are hereby incorporated in their entirety in the present application. The pulse width modulation may be sinusoidal, as described in the aforementioned document. However, any other profile is also conceivable in principle, including square-wave modulation. In the case of such a square-wave modulation, there would then simply be just two discrete duty cycles which alternate at regular intervals. The only critical thing is that the mean current value commutates between a negative value and a positive value. The "basic AC current" which is varied with the pulse width modulation frequency and which alternates with a predefined commutation frequency between the positive pulses and negative pulses may be a square-wave AC current. However, other AC current forms are also possible. The predefined current amplitude to be modulated may be the maximum or else an effective amplitude.

By virtue of the method according to the invention, the lamp can be operated in an extremely stable manner, wherein—since there is no need for anti-flutter pulses or other additional pulses—the power loss can be reduced. The additional current amplitude modulation ensures that an ideal light intensity can be produced with a precisely defined light intensity curve, in order to optimize the overall performance of the projection system.

A suitable lamp driver for operating a high-intensity discharge lamp in the manner according to the invention thus requires a commutator circuit which is designed in such a way that a DC current tapped off from a DC voltage source is converted into an AC current for the high-intensity discharge lamp, which commutates between positive pulses and negative pulses with a predefined current amplitude, and a pulse width modulation unit which is designed in such a way that a pulse width ratio between the pulse width of a positive pulse and the pulse width of an adjacent negative pulse is modulated in such a way that the mean current value of two successive positive and negative pulses fluctuates periodically between positive and negative values. According to the invention, an amplitude modulation unit is also required, which is designed in such a way that the value of the current amplitude is modulated in accordance with a predefined modulation function.

The method according to the invention and the lamp driver according to the invention can, as mentioned above, be used in a particularly advantageous manner in a projection system comprising a display device and a corresponding high-intensity discharge lamp. In principle, however, it is also possible to use the method according to the invention and the lamp driver according to the invention when using high-intensity discharge lamps in other fields requiring stable operation of the high-intensity discharge lamp in accordance with a defined temporal intensity curve.

The dependent claims respectively contain particularly advantageous refinements and developments of the invention. The lamp driver according to the invention and the projection system according to the invention can also be further developed in accordance with the dependent method claims, and vice versa.

With particular preference, the modulation of the pulse width ratio and the modulation of the value of the current amplitude are matched to one another in such a way that— considered over a predefined time period—the integral over all positive current pulses essentially corresponds to the integral over all negative current pulses. This time period may be for example one or more pulse width modulation periods, that is to say a time period of less than a few tenths of a second. This ensures that the lamp does not receive any significant DC current component. The lamp driver accordingly preferably has a suitable control unit for the matching synchronization.

The modulation function may take any form, that is to say the modulation function can in principle be adapted to the respective requirements—when used in a projection system in particular to the requirements of the display device. It is also possible in this case to vary the modulation function over time. However, it is preferably a periodic function. In one particularly preferred variant, upon use in a time-sequential projection system, the value of the current amplitude is modulated in stages, so that a constant current, and thus a constant light intensity, is output over specific time periods. For example, if necessary, a reduced or increased light intensity can be produced in different time periods. Upon operation of the high-intensity discharge lamp within a projection system, the modulation function for modulating the value of the current amplitude is particularly preferably synchronized with a color change sequence of a color change system, e.g. with the color wheel, of the projection system. That is to say, in the case of a periodic modulation function, for example, it is ensured that the period of the modulation function corresponds to the color change period. The projection system must in this case have, besides the color change system, a suitable synchronization device, for example within a central control device, which controls the lamp driver and the color change system in such a way that the modulation function for modulating the value of the current amplitude is synchronized with a color change sequence of the color change system.

The color balance of a projection of the projection system can be controlled by adjusting the modulation function. In this case, firstly a precise setting of the color balance is possible, but moreover the color balance can also be adjusted or kept constant by means of the method according to the invention, for example in order to counteract the effects of ageing. That is to say for example that variable light levels can be produced for the different primary colors and the color balance can be adjusted in order to alternate between a hot and a cold image impression, or to improve further properties of the projection system. One possibility is for example the incorporation of darker phases in order to improve the brightness resolution. Preferably, the lamp driver is designed in such a way that the modulation function can be varied as a function of corresponding control commands which are predefined or initiated for example by a user via a user interface, that is to say that the modulation function can be adjusted or a modulation function can be selected from a number of predefined modulation functions.

The invention will be further described with reference to examples of embodiments shown in the drawings to which, however, the invention is not restricted. Identical features are denoted by identical references in the figures.

Figure 2A:
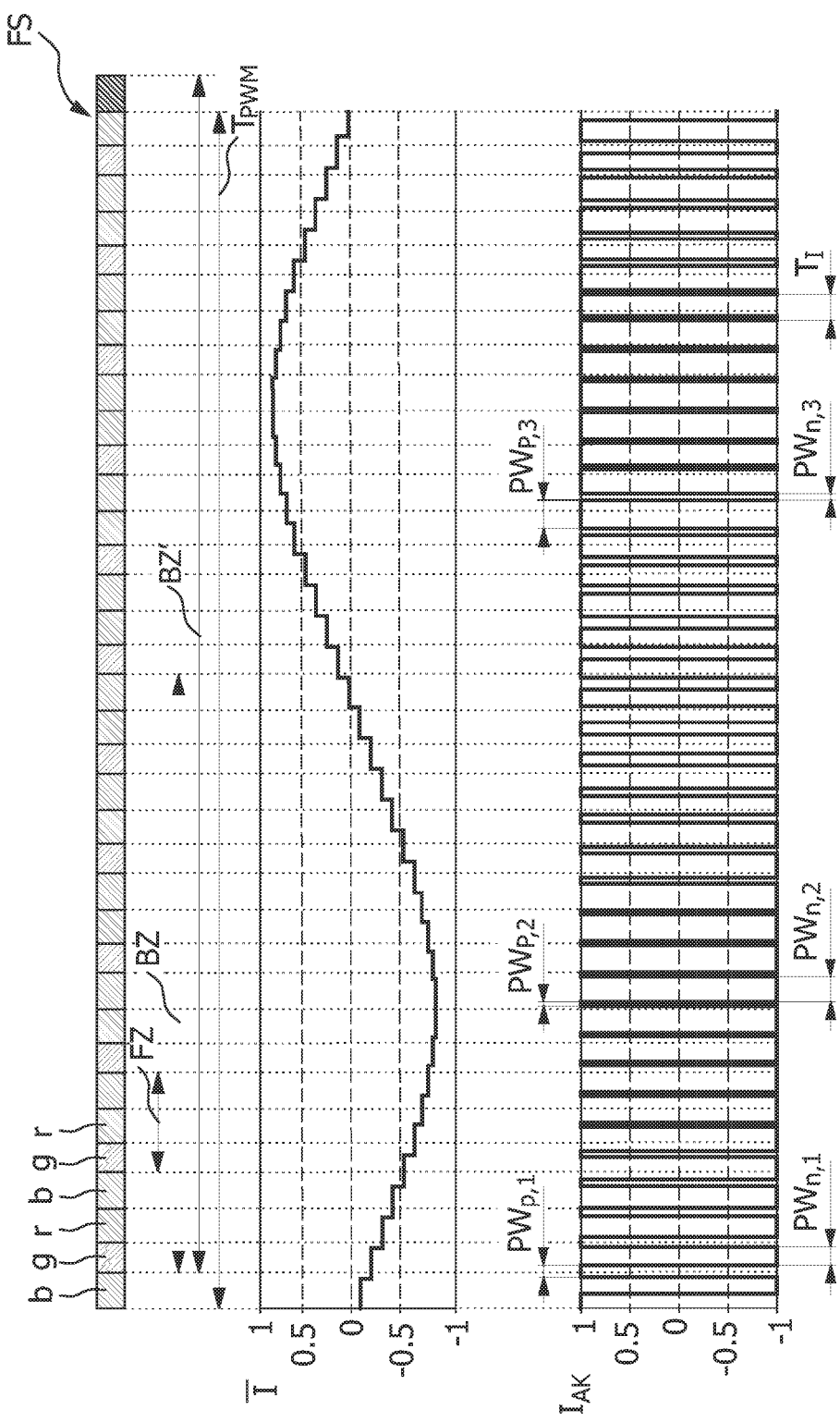
FIG. 2a shows a schematic representation of a pulse-width-modulated AC current (bottom diagram) and of the resulting mean current value over one pulse width modulation period (middle diagram) in temporal relation to a color change sequence within a projection system (top diagram).
Figure 2B:
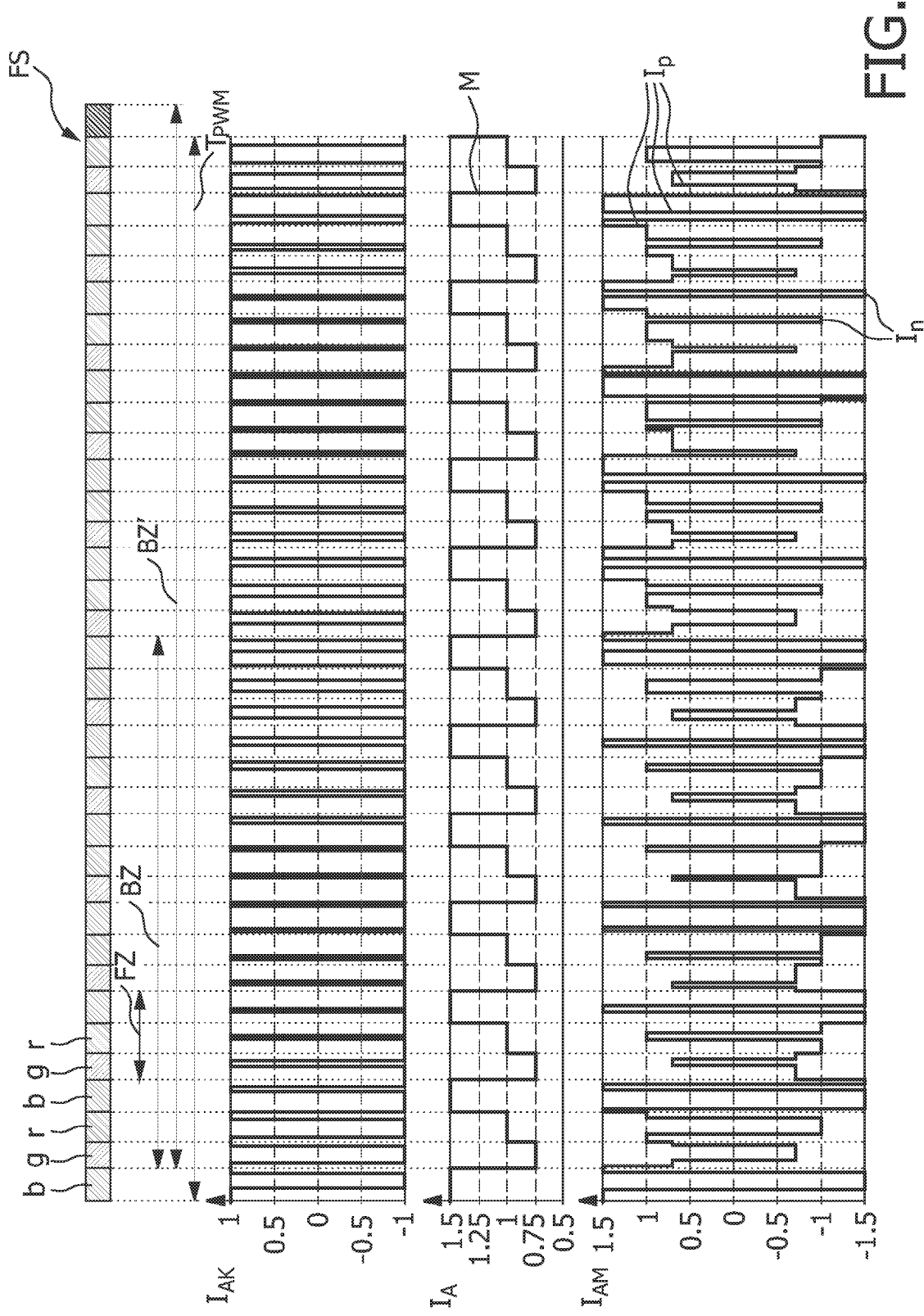

FIG. 2b shows a schematic representation of the color change sequence of FIG. 2a (top diagram) with the associated pulse-width-modulated AC current with a constant current amplitude according to FIG. 2a (diagram second from top) and of a matching amplitude modulation function (third diagram from top) and of the associated resulting amplitude-modulated and pulse-width-modulated AC current (bottom diagram).

Figure 3:
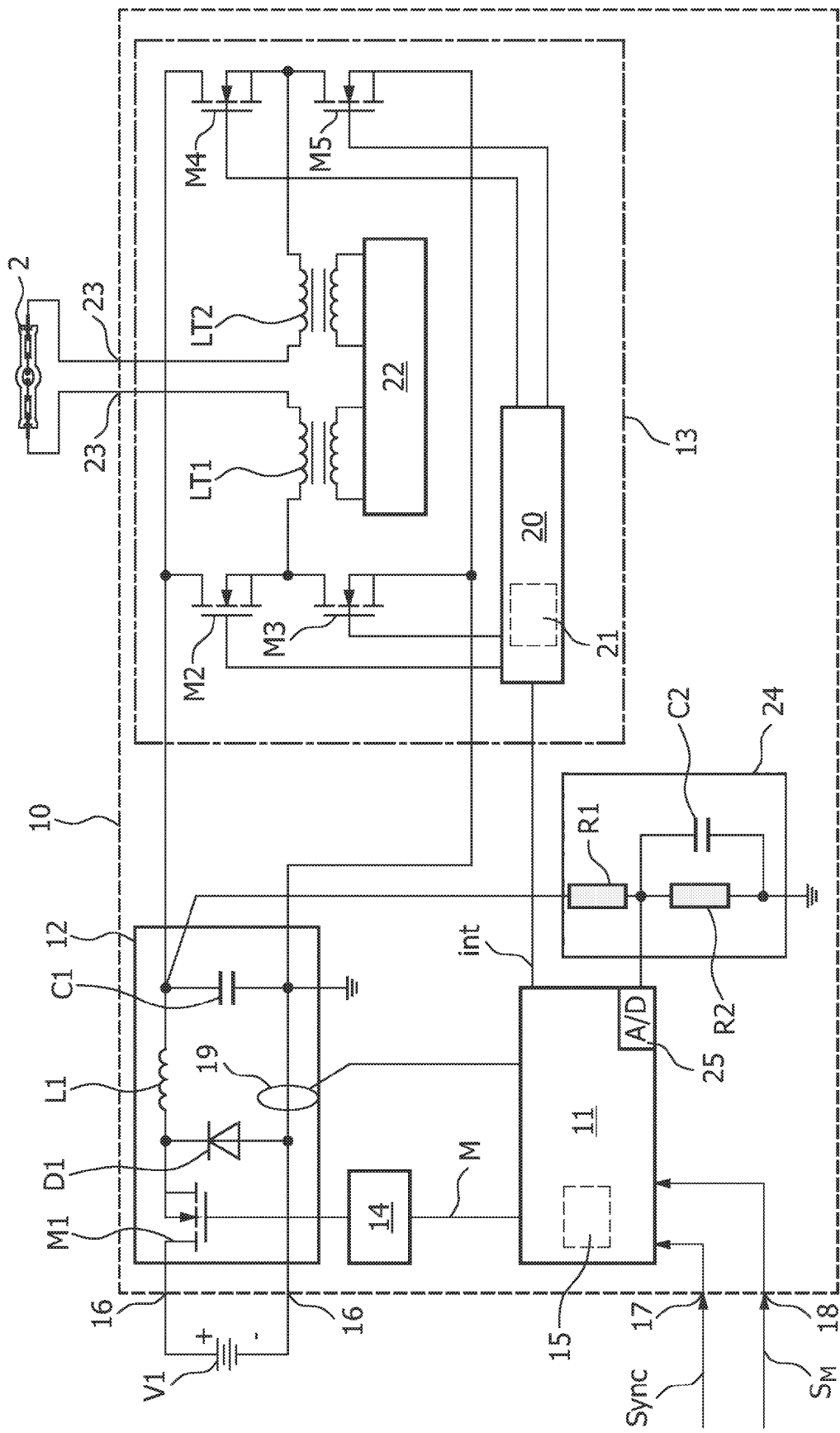

FIG. 3 shows a block diagram of one example of embodiment of a lamp driver according to the invention.

Figure 1:
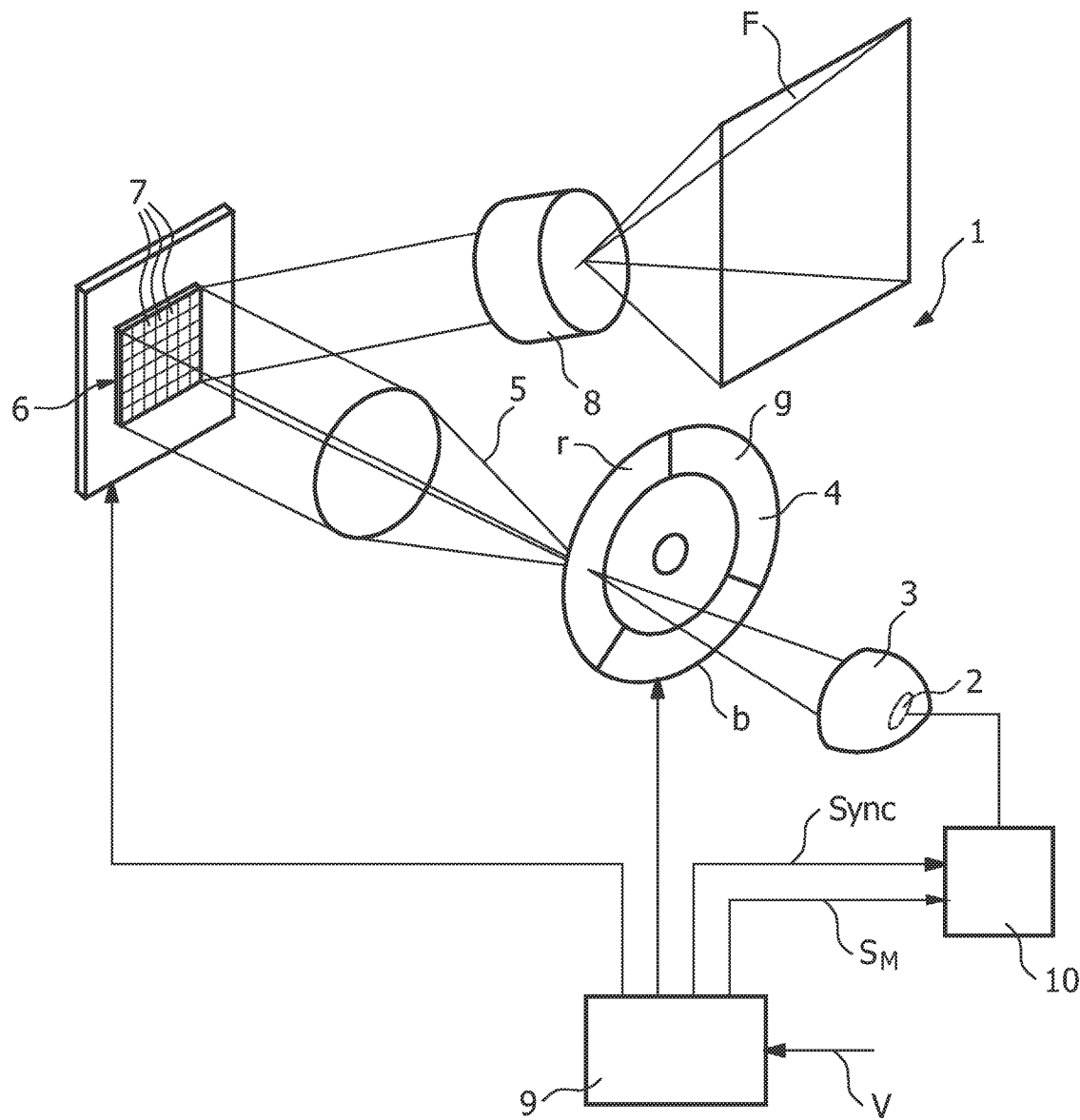
FIG. 1 shows a schematic representation of one example of embodiment of a projection system according to the invention.

FIG. 1 shows a typical DLP® projection system 1. This system has a high-intensity discharge lamp 2, preferably a so-called UHP (Ultra High Performance) lamp, which is arranged in a reflector 3. The lamp 2 is supplied with the necessary voltage or with the necessary current from a driver 10. The light emitted by the lamp 2 is radiated by the reflector 3 in a bundled form in the direction of a collecting lens 5. Between the reflector 3 and the collecting lens 5, a color change system 4, in this case in the form of a color wheel 4, is arranged in the beam path of the light. The color wheel 4 is preferably positioned as accurately as possible in the focal point located between the reflector 3 and the collecting lens 5, so that the light spot on the color wheel 4 is as small as possible. The collecting lens 5 ensures that a display device 6 located behind the collecting lens 5, in this case a so-called DMD (Digital Mirror Device), is illuminated as effectively as possible. Such a DMD is a chip comprising a matrix of very small mirrors 7 as display elements 7, which can be individually tilted so that the mirrors 7 reflect the light either through a projection lens 8 onto a projection surface F or, in the case of a suitably tilted mirror 7, onto an absorber surface (not shown).

The color wheel 4 in this case comprises three segments having the colors red r, green g and blue b. Within one image cycle BZ, this color wheel 4 usually rotates a number of times about its axis, so that a monochrome blue image, a monochrome red image and a monochrome green image are produced one after the other, and these images are combined as a result of the idleness of the eye of the viewer to form a color image. Instead of a color wheel comprising three segments, it is of course also possible for other color wheels to be used, such as for example color wheels comprising four segments (one red, one green, one blue and one white segment) or comprising six segments, in which in each case two green, two red and two blue segments lie opposite one another. The last variant has the advantage that the color wheel has to rotate with only half the frequency. Alternatively, other, different color segments could also be added, such as e.g. yellow, cyan, etc.

A control device 9 controls the display device 6 (hereinafter also referred to as "display" for short), the color wheel 4 and the lamp driver 10 and thus ensures the synchronization of these components 6, 4, 10. As input signal, the control device 9 can receive for example a video signal V which contains the video data that are to be displayed by the projection system 1. Clearly, the control device 9 may also consist of a number of partial control devices. For example, a separate control device may also be provided for controlling the display elements 7 of the display 6, which separate control device may in particular also be arranged with the DMD chip on a board. It is likewise possible for the complete control device to be integrated for example with the DMD chip in one module, and for the synchronization commands for the other components to be output from there. It is also possible for the other components such as color wheel or lamp driver to have their own control devices which in turn transmit synchronization commands to the other components. The only critical thing is that the components are synchronized with one another in the required way so that the desired image is produced on the projection surface F.

Of course, the lamp driver according to the invention and the method according to the invention can be used not only in the projection system shown in FIG. 1 but also in a projection system of different design, for example in an LCoS system.

The operating method according to the invention will now be explained in further detail below with reference to FIGS. 2a and 2b.

Shown at the very top in FIG. 2a is a color sequence FS which is produced by rotating the color wheel 4 in the projection system 1 according to FIG. 1. As shown, the blue b, green g and red r image always alternate cyclically. Between the individual primary color images b, g, r, there is usually a given short time period—referred to as the "spoke"—in which the color image is not defined, since the light spot impinges precisely on a boundary between two color segments. In many systems, the display is shown in this "spoke time". In other systems, the light produced during this time is used to increase the overall intensity.

Two curves are shown below this color sequence FS. This example shows a pulse-width-modulated AC current for a high-intensity discharge lamp in which the value of the amplitude of the AC current is kept constant as described in WO 02/091806 A1. The AC current $I_{AK}$ commutates in this example with 1 kHz and an 80% pulse width modulation is carried out with a pulse width modulation frequency of 25 Hz. The upper curve shows the mean value $\bar{I}$ (in relative units) over one pulse width commutation cycle (that is to say one pulse width period $T_{PWM}$). The lower curve shows the current direction, that is to say the positive and negative pulses of the AC current $I_{AK}$ with constant amplitude (in relative units).

The lower diagram also shows the pulse widths for various pulse pairs, that is to say positive and respective subsequent negative pulses. In the case of the pulse pair shown on the far left, the pulse width $PW_{p,1}$ of the positive pulse is approximately equal to the pulse width $PW_{n,1}$ of the negative pulse. In the case of the pulse pair shown next, the pulse width $PW_{p,2}$ of the positive pulse is much smaller than the pulse width $PW_{n,2}$ of the negative pulse, and in the case of the third pulse pair shown the pulse width $PW_{p,3}$ of the positive pulse is greater than the pulse width $PW_{n,3}$ of the negative pulse. In each case, the period $T_I$ lasting from the zero crossing by the positive pulse to the zero crossing at the end of the negative pulse is constant, said period corresponding to the inverse value of the commutation frequency. That is to say, in the pulse width modulation, only the position of the zero crossing is modulated by the transition from the positive pulse to the negative pulse. As a result, the mean value $\bar{I}$ of the current which is plotted in the upper diagram varies at each point in time within a commutation period $T_{PWM}$. This mean value $\bar{I}$ also corresponds to the pulse width ratio. As shown in the upper curve in FIG. 2a, the pulse width modulation follows a sinusoidal curve. Alternatively, however, it is also possible for a different function to be used.

Between the color change sequence FS and the upper diagram, various time periods are shown. Firstly, the temporal distance of a color cycle FZ is shown, consisting of a green g, red r and blue b image. In the present example, such a color cycle FZ is repeated with a repeat frequency of 300 Hz. Also shown is a short image cycle BZ of 50 Hz, as can be used for a PAL video system, and a long image cycle BZ' of 25 Hz, which corresponds to double the short image cycle of 50 Hz and can be used for example in the case of DVD film material. The pulse width modulation period $T_{PWM}$ is also shown.

FIG. 2b shows how, by means of a modulation function M, the value of the amplitude of the AC current $I_{AM}$ applied to the high-intensity discharge lamp can be modulated to achieve a color dot that is balanced in a certain way.

FIG. 2b again shows at the top the color change sequence FS and below this the temporal distances for a color cycle FZ, a short image cycle BZ of 50 Hz, a long image cycle BZ' of 25 Hz and the pulse width modulation period $T_{PMW}$. The curve which was already shown at the bottom of FIG. 2a is again shown directly below this, said curve showing a pulse-width-modulated current $I_{AK}$ with constant current amplitude. An assumed current or power modulation function M is shown therebelow in a further diagram. This shows the relative current amplitude $I_A$ between 0.5 and 1.5 (relative units). The value 1 here corresponds to the current value selected as reference during the red segment. The modulation function M is in this case a periodic, step-by-step function. The modulation function M is furthermore correlated with the color change sequence FS, as can be seen from FIG. 2b. In the illustrated example, it is assumed that the projection system 1 and the display system 6 require more blue components and fewer green components for optimal image balance. Therefore, the current is increased to 1.5 in the blue segments b of the color sequence FS and reduced to 0.75 in the green segments.

The bottom curve shows the resulting lamp current $I_{AM}$ which is applied to the lamp 1 and which has accordingly been pulse-width-modulated and amplitude-modulated in accordance with the modulation function M. The amplitude of this lamp current $I_{AM}$ moves between a maximum current amplitude of 1.5 and a minimum current amplitude of −1.5 (relative units). For power regulation, the current must accordingly be scaled to the lamp voltage so that the mean value corresponds to the required nominal current.

FIGS. 2a and 2b also show how, to compensate a possible DC current component, the position of the pulse width modulation and of the amplitude modulation function M must be matched to one another. Here, firstly a "better" behavior of the system has been achieved by slightly displacing the sampling values of the sinusoidal pulse width modulation, that is to say the system does not react as much to errors, such as e.g. an unintentional shift in the synchronization frequency. Moreover, it has been ensured, by shifting the position of the modulation function with respect to the pulse width modulation, that the DC current component is completely evened out within a pulse width modulation period $T_{PWM}$. Moreover, there are further possibilities for preventing DC current components. Firstly, the commutations can be fully coupled to the segment transitions between the color segments r, g, b. Secondly, a balancing of any asymmetries which occur, and which may lead to a DC current, in one or two commutation cycles of each pulse width modulation period $T_{PWM}$ can be carried out in a targeted manner in accordance with measurements and calculations carried out in the lamp driver. Finally, each commutation cycle can be adapted while taking into account errors that have occurred in the past. That is to say, roundings or minimal modifications to switching times for example can always be carried out in the direction of smallest error.

FIG. 3 shows one example of embodiment of a lamp driver 10 which can be used to implement in a simple manner the method according to the invention for operating the high-intensity discharge lamp 2.

The lamp 2 is connected via suitable lamp terminals 23 to this driver 10. The lamp driver 10 is connected via voltage supply terminals 16 to a DC voltage supply V1. The external DC power supply is in this case 380 V for example. On the input side, the driver 10 has a DC/DC converter 12, which is responsible for impressing the desired lamp current. This DC/DC converter 12 is formed by a switch M1, a diode D1, an inductance L1 and a capacitance C1, for example a capacitor.

A control device 11 controls the switch M1 and thus the current in the lamp 2 by means of a level shifter 14. Depending on the embodiment, the current is also monitored by the control device 11 by means of an inductive measuring element 19. For voltage measurement, a correspondingly reduced voltage is tapped off at the capacitor C1 via a voltage divider 24, consisting of two resistors R1, R2, and is measured in the control device 11 by means of an analog/digital converter 25. The capacitor C2 serves only to reduce interference in the measured signal.

The accordingly pre-impressed current is then transmitted to a commutator circuit 13 which comprises a commutator driver 20 which switches four switches M2, M3, M4, M5 in the manner of a bridge circuit and thus correspondingly commutates the current on the lamp 2.

For ignition purposes, the lamp 2 is also connected to an ignition transformer 22. This ignition transformer 22 is usually, as shown here, applied symmetrically to both terminals 23 of the lamp 2. The ignition transformer 22 provides up to 20 kV for igniting the lamp 2. Moreover, the inductances LT1, LT2 of the ignition transformer 22 also act during further operation of the lamp 2 to smooth the current.

Thus far, the lamp driver 10 shown in FIG. 3 does not differ from a conventional lamp driver.

According to the invention, however, unlike conventional lamp drivers, a pulse width modulation unit 21 is located within the commutator circuit 13, in this case specifically within the commutator driver 20 which is designed in the form of a programmable processor. This ensures that, as described above, in each case the position of the zero crossing between positive and subsequent negative pulses is shifted within a commutation period in such a way that the pulse width ratio between positive pulses and adjacent negative pulses is modulated in accordance with the desired modulation form.

Moreover, an amplitude modulation unit 15 is located within the control device 11 which may likewise be designed in the form of a programmable processor, and this amplitude modulation unit influences the DC/DC converter 12, specifically the switch M1, via the level shifter 14 in accordance with the set modulation function M in such a way that the desired amplitude modulation of the value of the AC current is achieved. This amplitude modulation unit 15 may be embodied in the form of software on the programmable processor of the control device 11.

The control device 11 in this case transmits an internal synchronization signal int to the pulse width modulation unit 21, so as to ensure that the modulation of the pulse width ratio and the modulation of the value of the current amplitude, as shown above, are suitably matched to one another so that the generation of DC current components is avoided.

Via an input 17 of the lamp driver 10, the control device 11 receives a synchronization signal Sync from the central control device 9 (see FIG. 1), so that it is ensured that the modulation function M for modulating the value of the current amplitude is synchronized with the color change sequence FS of the color wheel 4 of the projection system 1.

Moreover, the control device 9 can transmit to the control unit 11 and/or the amplitude modulation unit 15, via an input 18 of the lamp driver 10, a signal $S_M$ for varying the modulation function M, in order to vary the modulation function M when this is required.

By way of example, the color balance can thus be adjusted to change between a hot and a cold image impression. A setting of different color temperatures on the display is possible by simply varying the ratio between the red component and the blue component. This can be carried out rapidly in the manner according to the invention by suitably adjusting the modulation function, without a loss of resolution and light.

Likewise, a higher gray level resolution, particularly in dark scenes, can be achieved, wherein it is not necessary—as is currently the case in alternative concepts—to use dark segments in the color wheel. Instead, the increase in the gray level resolution can be achieved in a simple manner by adding corresponding low power levels in the modulation function, without a loss of light. Conversely, a greater image brightness, e.g. for presentations in lit rooms, can be achieved by increasing the amplitudes in an existing white segment. This image brightness can be switched off at any time in order to once again achieve the maximum color saturation, e.g. for a video presentation.

Preferably, a control device 9 of the projection system has a suitable user interface (not shown), by means of which the operator can manually adjust the modulation function M or can select between various optimal modulation functions M which have already been defined and stored in the control device 9, which are then transmitted to the lamp driver 10 via the corresponding control signal $S_M$. Alternatively, various optimal modulation functions M which have already been defined can also be stored in the lamp driver 10, and these are then selected by means of a control signal $S_M$ from the control device 9.

Consequently, by means of the method and lamp driver according to the invention, it is possible to provide in each case the exact amount of light that is required for "flutter-free" operation in a number of freely selected time periods, so that on the one hand, for example in rear projection televisions, the image brightness can be increased by 30% or more and at the same time the gray level resolution can be improved. Likewise, different color temperatures can be selected in a simple manner without losses. Optimal adaptation to almost any display is thus possible without any considerable complexity by means of simple commutation.

Finally, it should be pointed out once again that the systems and methods shown in the figures and in the description are merely examples of embodiments which can be varied widely by the person skilled in the art without departing from the scope of the invention. It should also be pointed out for the sake of completeness that the use of the indefinite article "a" or "an" does not rule out the possibility that the features in question may also exist in multiple.

The invention claimed is:

1. A method for operating a high-intensity discharge lamp, the method comprising:
   acting upon the high-intensity discharge lamp with an AC current which commutates between positive pulses and negative pulses with a predefined current amplitude, wherein a pulse width ratio between the pulse width of a positive pulse and the pulse width of an adjacent negative pulse is modulated in such a way that the mean current value of two successive positive and negative pulses—one positive pulse and one negative pulse—fluctuates periodically between positive and negative values and
   modulating the value of the current amplitude in accordance with a predefined modulation function.

2. The method of claim 1, wherein the modulation of the pulse width ratio and the modulation of the value of the current amplitude are matched to one another in such a way that, considered over a predefined time period, the integral over all positive current pulses essentially corresponds to the integral over all negative current pulses.

3. The method of claim 1, wherein the modulation function is a periodic function.

4. The method of claim 1, wherein the value of the current amplitude is modulated in stages.

5. The method of claim 1, wherein the high-intensity discharge lamp is operated within a projection system and the modulation function for modulating the value of the current amplitude is synchronized with a color change sequence of a color change system of the projection system.

6. The method of claim 5, wherein the color balance of a projection of the projection system is controlled by adjusting the modulation function.

7. The method of claim 1, wherein the modulation function can be varied as a function of control commands.

8. A lamp driver for a high-intensity discharge lamp, comprising:
   a commutator circuit configured such that a DC current tapped off from a DC voltage source is converted into an AC current for the high-intensity discharge lamp, which commutates between positive pulses and negative pulses with a predefined current amplitude;
   a pulse width modulation unit (21) configured such a that a pulse width ratio between the pulse width of a positive pulse and the pulse width of an adjacent negative pulse is modulated in such a way that the mean current value of two successive pulses—one positive pulse and one negative pulse—fluctuates periodically between positive and negative values; and
   and an amplitude modulation unit configured such that the value of the current amplitude is modulated in accordance with a predefined modulation function.

9. The lamp driver of claim 8, wherein the pulse width modulation unit is integrated in the commutator circuit and the amplitude modulation unit influences a DC-DC converter which defines the level of the operating current of the high-intensity discharge lamp.

10. A projection system, comprising:
    a display device;
    a high-intensity discharge lamp; and
    a lamp driver as claimed in claim 8.

11. The projection system of claim 10, further comprising:
    a color change system; and
    a synchronization device which controls the lamp driver and the color change system in such a way that the modulation function for modulating the value of the current amplitude is synchronized with a color change sequence of the color change system.

12. The method of claim 2, wherein the modulation function is a periodic function.

13. The method of claim 2, wherein the value of the current amplitude is modulated in stages.

14. The method of claim 3, wherein the value of the current amplitude is modulated in stages.

15. The method of claim 2, wherein the high-intensity discharge lamp is operated within a projection system and the modulation function for modulating the value of the current amplitude is synchronized with a color change sequence of a color change system of the projection system.

16. The method of claim 3, wherein the high-intensity discharge lamp is operated within a projection system and the modulation function for modulating the value of the current amplitude is synchronized with a color change sequence of a color change system of the projection system.

17. The method of claim 4, wherein the high-intensity discharge lamp is operated within a projection system and the modulation function for modulating the value of the current amplitude is synchronized with a color change sequence of a color change system of the projection system.

18. The method of claim 2, wherein the modulation function can be varied as a function of control commands.

19. The method of claim 3, wherein the modulation function can be varied as a function of control commands.

20. The method of claim 4, wherein the modulation function can be varied as a function of control commands.

\* \* \* \* \*